3,087,978
POLYMERIZATION OF ETHYLENE AND OF MIXTURES THEREOF WITH OTHER OLEFINS

Thomas P. Wilson, Charleston, and George F. Hurley and Robert M. Manyik, St. Albans, W. Va., assignors to Union Carbide Corporation, a corporation of New York
No Drawing. Filed July 26, 1960, Ser. No. 45,301
6 Claims. (Cl. 260—683.15)

This invention relates to a process for the polymerization of ethylene. More particularly it is concerned with an improved process for polymerizing ethylene, and of mixtures thereof with other olefins, to produce liquid condensates.

The production of liquid products from ethylene has long been known. It has now been found that high yields of liquid unsaturated condensates of ethylene, or of mixtures of ethylene with other olefins having an allylic hydrogen atom, can be produced by heating the mixture of olefin and catalyst while in contact with a polynuclear aromatic hydrocarbon promoter. It has also been found that certain gases have an added activating effect when the catalyzed reaction mixture contains ethylene as the sole olefin, thus enabling one to obtain a higher conversion at milder reaction conditions.

By the process of this invention, unsaturated liquid polymers, or condensates, of ethylene are produced by contacting ethylene, or mixtures thereof with other olefins having an allylic hydrogen atom, at a pressure of from about 200 p.s.i.g. to as high as about 4000 p.s.i.g. or more and at a temperature of from about 100° C. to about 325° C. with a suspension of potassium or sodium metal as catalyst in an inert organic solvent and a polynuclear aromatic hydrocarbon promoter. If desired, an activator, as will be shown, can also be present when ethylene is the sole olefin present in the reaction mixture. In a preferred embodiment of this invention temperatures of from about 150° C. to about 225° C. and pressures of from about 500 p.s.i.g. to about 2000 p.s.i.g. are employed. Higher temperatures and pressures than those specified can be used, but under such conditions wax-like products are favored, even though the reaction rate is greater; agitation is, of course, beneficial, and the reaction can be carried out in either a continuous or batchwise manner.

The catalysts useful in the process of this invention are metallic potassium and sodium, and alloys or mixtures thereof. Surprisingly, lithium was found to be ineffective as a catalyst. The catalyst is present in the form of a finely divided suspension, having an average particle size of from about 0.5 to about 250 microns and preferably from about 2 to about 25 microns in an inert organic solvent, such as heptane, decalin, nonane, cumene, and so forth. Any inert organic solvent which does not interfere with the reaction can be used. The concentration of the catalyst can be varied from about 1 percent to about 10 percent by weight, or more, based on the total weight of the monomers charged. The preferred catalyst concentration is from about 2.5 percent to about 7.5 percent by weight; and, if desired, it can be supported on an inert carrier.

The olefins which can be reacted with ethylene by the process of this invention to produce higher molecular weight unsaturated liquid products are the unsaturated hydrocarbon olefins having an allylic hydrogen atom. That is, those olefins which have a hydrogen atom directly attached to a carbon atom which is alpha to a carbon atom having a double bond, as indicated by an asterisk in the following formula:

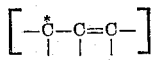

The olefins suitable for use in the reaction with ethylene are those containing up to about 12 carbon atoms. Illustrative thereof are, for example, propylene, isobutene, butene-1, butene-2, pentene-1, pentene-2, 3-methyl-1-butene, 2-methyl-1-butene, hexene-1, 4-methyl-1-pentene, octene-1, 3-methyl-1-hexene, 3-methyl-1-pentene, 4,4-dimethyl-1-hexene, 4,4-dimethyl-1-nonene, 5,5-dimethyl-1-hexene, and the like. Unexpectedly, it was found that the rate of reaction of a mixture of ethylene with another olefin is considerably higher than that obtained by either pure component, and in some instances shows a five- to ten-fold increase.

It has now been found that the addition of a promoter to the catalyzed reaction mixture results in a smooth, efficient reaction having a high conversion rate. This promoter is a polynuclear aromatic hydrocarbon containing two aromatic nuclei, either fused together as in naphthalene, or connected to each other by a carbon-carbon bond as in diphenyl, or by a carbon-carbon bond and a divalent alkyl chain as in fluorene. The promoters found useful in this invention are the polynuclear aromatic hydrocarbons containing two aromatic rings, at least one of which is a six-carbon ring, and include, for example, naphthalene, acenaphthene, fluorene, diphenyl, and the like.

The promoter is present in the reaction at concentrations of from about 0.1 percent to about 10 percent by weight based on the total weight of the monomers charged, with the preferred promoter concentration being from about 0.2 percent to about 6.5 percent by weight. The need for a promoter is demonstrated by the fact that when the reaction is carried out under the same reaction conditions of this invention but without any promoter present, polymerization occurs at a much slower rate. Also, in the absence of promoter the catalyst agglomerates to form a large mass, thus stopping the reaction.

The presence of an excessively high promoter concentration in the reaction mixture does not show any advantages on the reaction rate. However, trace impurities that may be present in the promoter exert a harmful effect on the reaction rate by poisoning the catalyst. Thus, it is preferred that the promoter concentration be kept within the range specified above.

In addition to the need for a polynuclear aromatic promoter, it has been found that certain gases serve to further activate the reaction. These gases are herein called activators, and are used in conjunction with the promoters. The promoters, as previously indicated, can be used by themselves without added activator; the activators are generally effective only when promoter is present.

The gases found to be effective as activators are carbon monoxide and carbon dioxide; and these activators are used at concentrations of from about 0.1 percent to about 30 percent by weight, based on the total weight of the monomers charged. The preferred activator concentration is from about 0.3 percent to about 7 percent by weight.

The following examples further serve to illustrate the invention, but are not to be construed as being limitative thereof.

Example 1

A 1200 milliliter stainless steel rocking autoclave was charged with 200 milliliters of decalin as solvent and 2 grams of naphthalene as promoter. The autoclave was purged with nitrogen, 5 grams of finely divided potassium was added as catalyst, and the autoclave was sealed and purged with ethylene. Ethylene was then added until a pressure of 660 p.s.i.g. was obtained, and the reactor was sealed. The autoclave was heated to 150° C. and the reaction was allowed to proceed for 20 hours at this temperature at a pressure range of from 1010 p.s.i.g.

to 435 p.s.i.g. At the end of this period the reactor was cooled, vented to remove unreacted monomer, and isopropanol was injected to destroy the excess catalyst. The reaction mixture was filtered to remove a small amount of solid matter, and the filtrate was distilled to give 73 grams of a mixture of liquid polymeric condensates of ethylene. The liquid condensate was fractionally distilled and the following fractions were identified:

(a) Hexenes; boiling point 53–58° C.; 3.5 grams
(b) Octenes; boiling point 120–130° C.; 9.0 grams
(c) Decenes; boiling point 145–170° C.; 29.6 grams
(d) Higher alkenes; boiling point 170–195° C.; 31.0 grams A control run carried out under the same conditions but in the absence of any promoter failed to produce any condensation products. In this control experiment the catalyst used was a mixture of 2.3 grams of sodium and 7.7 grams of potassium.

Substitution of fluorene or acenaphthene for naphthalene as the promoter gives similar results, and a liquid condensate is produced.

*Example 2*

In a manner similar to that described in Example 1 ethylene was polymerized to yield 4 grams of liquid products. The catalyst consisted of a mixture of 2.3 grams of sodium and 7.7 grams of potassium; and 1.3 grams of naphthalene was used as promoter.

The following experiments were carried out in a manner similar to that described in Example 1 with the exception that an activator, either carbon dioxide or carbon monoxide, was introduced into the autoclave after the ethylene had been charged. The amount of activator charged was determined by measuring the pressure rise in the autoclave. The results are tabulated as follows:

14 grams of product consisting of a mixture of higher boiling olefins.

*Example 15*

A mixture of ethylene containing 0.7 mole of 3-methyl-1-butene per 1.9 moles of ethylene was reacted for 19.5 hours in a manner similar to that described in Example 1 but using 0.2 gram of naphthalene as promoter and 3 p.s.i. of carbon dioxide as activator. There was obtained 163 grams of liquid condensation products, which was fractionally distilled. The largest single fraction was 30 grams of 3,3-dimethyl-1-pentene.

*Example 16*

A mixture of ethylene containing 0.8 mole of butene-1 per 1.9 moles of ethylene was reacted for about 15 minutes in a manner similar to that described in Example 1 but using 10 grams of diphenyl as promoter and 1.5 p.s.i. of carbon dioxide as activator. There was obtained 99 grams of liquid condensation products, which on fractional distillation was identified as follows:

(a) 3-methyl-1-pentene, 36 grams
(b) Octenes, boiling point 100–145° C.; 30 grams
(c) Decenes and above; boiling point 145° C. up; 33 grams

*Example 17*

(A) In this example commercial anhydrous decalin was used following the procedure of Example 3, but omitting the naphthalene promoter. There was obtained 69 grams of liquid condensation products consisting of a mixture of higher boiling olefins.

(B) When the above experiment was repeated using 3 p.s.i. of carbon dioxide and recharging the reactor with ethylene as it was consumed, there was obtained 207 grams of liquid condensation products after 18 hours.

| Example | 3 | 4 | 5 | 6 | 7 | 8 | 9 | 10 | 11 | 12 |
|---|---|---|---|---|---|---|---|---|---|---|
| Catalyst, g.: | | | | | | | | | | |
| Sodium | 2.3 | 2.3 | 2.3 | 2.3 | 2.3 | 2.3 | 2.3 | 2.3 | | 5 |
| Potassium | 7.7 | 7.7 | 7.7 | 7.7 | 7.7 | 7.7 | 7.7 | 7.7 | 8 | |
| Promoter, g.: | | | | | | | | | | |
| Naphthalene | 0.2 | 1.3 | 1.3 | | | 0.2 | 0.2 | 1.3 | 0.2 | 2 |
| Diphenyl | | | | 10 | (1) | | | | | |
| Activator, p.s.i.: | | | | | | | | | | |
| $CO_2$ | 6 | 6 | 6 | 6 | 6 | 3 | 35 | | 35 | 15 |
| CO | | | | | | | | 6 | | |
| Reaction time, hrs | 20 | 20 | 14.5 | 2.5 | 2.8 | 6.5 | 20 | 20 | 20 | 20 |
| Total product, g | 111 | 108 | 77 | 84 | 79 | 28 | 56 | 108 | 54 | 13 |
| Product identity: | | | | | | | | | | |
| Hexenes, g | | 2.7 | 23 | 8.4 | | | 12 | | | |
| Octenes, g | | 47 | 13 | 20 | | | 16 | | | |
| Decenes, g | | 17.5 | | | | | | | | |
| Higher alkenes, g.[2] | | ca. 41 | 23 | | | | 28 | | | |
| Wax | | | 18 | | | | | | | |

[1] 200 grams of a mixture of 70 percent diphenyl and 30 percent methyl diphenyl.
[2] Alkenes above $C_8$ except where otherwise indicated.

*Example 13*

This example was conducted in a manner similar to that described in Example 3, but using 10 grams of naphthalene as promoter. The reaction was maintained for 48 hours by the further addition of ethylene to the reactor as it was needed. There was obtained 216 grams of condensate, which on fractional distillation was identified as follows:

(a) Hexenes, boiling point 51–67° C.; 15.8 grams
(b) Octenes, boiling point 69–160° C.; 38.9 grams
(c) Decenes, boiling point 165–180° C.; 41.0 grams
(d) Higher alkenes, 120.3 grams

*Example 14*

A mixture of ethylene containing 0.3 mole of isobutene per 1.9 moles of ethylene was reacted for 5 hours in a manner similar to that described in Example 1 but using 0.2 gram of naphthalene as promoter and 3 p.s.i. of carbon dioxide as activator. There was recovered The liquid condensate was fractionally distilled, and the following fractions were identified:

(a) Hexenes, boiling point 51–70° C.; 37.3 grams
(b) Octenes, boiling point, 71–142° C.; 70.5 grams
(c) Decenes, boiling point 143–175° C.; 39.4 grams
(d) Higher alkenes, boiling point 175° C. up; 57.0 grams
(e) Wax, 2.8 grams In the following series, the catalyst was prepared by adding potassium as catalyst to 200 milliliters of decalin containing about 0.5 to 1 gram of oleic acid and stirring the mixture at about 6000 r.p.m. for about 15 minutes at 150° C. The polynuclear aromatic hydrocarbon promoter was then added and the mixture was stirred for an additional period of time, cooled, and then transferred under nitrogen to a glass liner for a rocker bomb. The liner was placed in the rocker bomb and the olefins were charged. The sealed rocker bomb was reacted at the conditions indicated in the table. It was then cooled, vented, and the liquid product fractionally distilled. The principal products produced are indicated for each example.

| Example | 18 | 19 | 20 | 21 | 22 | 23 | 24 |
|---|---|---|---|---|---|---|---|
| Catalyst, g | 15 | 15 | 5 | 4 | 5 | 5 | 5 |
| Promoter, g., Diphenyl | 5 | 5 | 10 | 2 | 2.5 | 5 | 5 |
| Olefin reactants, g.: | | | | | | | |
|   Ethylene | 21 | 21 | 42 | 42 | 22 | 28 | 18 |
|   Propylene | 120 | 120 | | | | | |
|   Butene-1 | | | 67 | 67 | | | |
|   Butene-2 | | | | | | 95 | |
|   Isobutene | | | | | | | 112 |
|   Mixed 2-methyl-1-butene and pentene-2 | | | | | | | 91 |
| Reaction time, min | 13 | 90 | 15 | 20 | 20 | 50 | 20 |
| Reaction temp., °C | 114–125 | 113 | 150–200 | 85–150 | 99–150 | 101–114 | 102–131 |
| Total product, g | 31 | 67 | 84 | 84 | 87 | 125 | 80 |
| Product analysis: | | | | | | | |
|   $C_5$ fraction, g | 25 | 45 | | | | | |
|     pentene-1 | (¹) | (¹) | | | | | |
|   $C_6$ fraction, g | 6 | 11 | 45 | 49 | 73 | 70 | |
|     4-methyl-1-pentene | (¹) | (¹) | | | | | |
|     3-methyl-a-pentene | | | (¹) | (¹) | | | |
|     3-methyl-trans-2-pentene | | | | | (¹) | | |
|     2-methyl-1-pentene | | | | | | (¹) | |
|   $C_7$ fraction, g | | 11 | | | | | 66 |
|     heptene-1 | | (¹) | | | | | |
|     3-ethyl-1-pentene | | | | | | | (¹) |
|     2,3-dimethyl-1-pentene | | | | | | | (¹) |
|   $C_8$ fraction, g | | | 39 | 35 | 14 | 55 | |
|     3-methyl-1-heptene | | | (¹) | (¹) | (¹) | | |
|     3-methyl-3-ethyl-1-pentene | | | (¹) | (¹) | (¹) | | |
|     2-n-propyl-1-pentene | | | | | | (¹) | |

¹ Indicates the principal components found in the fraction.

What is claimed is:

1. In the process for producing liquid condensates of ethylene, which comprises introducing a charging stock comprising ethylene, an inert organic diluent, a catalyst selected from the group consisting of potassium and sodium from 0.1 to 10 percent by weight based on the olefinic monomer charged of an aromatic hydrocarbon containing two aromatic rings as promoter, and from 0.1 to 30 percent by weight based on the olefinic monomer charged of an activator selected from the group consisting of carbon monoxide and carbon dioxide into a reaction zone at a temperature of from about 100° C. to about 325° C. and a pressure of at least about 200 p.s.i.g. and recovering and fractionally distilling the liquid ethylene condensates thus produced.

2. In the process for producing liquid condensates of ethylene, which comprises introducing a charging stock comprising ethylene, an inert organic diluent, a catalyst selected from the group consisting of potassium and sodium, from 0.2 to 6.5 percent by weight based on the olefinic monomer charged of an aromatic hydrocarbon containing two aromatic rings as promoter selected from the group consisting of naphthalene, acenaphthene, fluorene, and diphenyl, and from 0.7 to 7 percent by weight based on the olefinic monomer charged of an activator selected from the group consisting of carbon monoxide and carbon dioxide into a reaction zone at a temperature of from about 150° C. to about 225° C. and a pressure of from about 500 p.s.i.g. to about 2000 p.s.i.g. and recovering and fractionally distilling the liquid ethylene condensates thus produced.

3. A process as claimed in claim 1, wherein a second olefin having an allylic hydrogen atom and containing from 3 to about 12 carbon atoms is also present in the charging stock.

4. A process as claimed in claim 1, wherein the promoter is diphenyl.

5. A process as claimed in claim 1, wherein the promoter is naphthalene.

6. A process for producing 3-methyl-1-pentene as claimed in claim 1, wherein the monomers in the charging stock are ethylene and butene-1.

References Cited in the file of this patent

UNITED STATES PATENTS

| | | |
|---|---|---|
| 2,384,916 | Holmes | Sept. 18, 1945 |
| 2,492,693 | Freed | Dec. 27, 1949 |
| 2,942,042 | Folz | June 21, 1960 |
| 2,980,743 | Toft | Apr. 18, 1961 |

OTHER REFERENCES

"Handling Sodium in Organic Reactions," by V. L. Hansley, Ind. & Eng. Chem., August 1951, vol. 43, No. 8, pp. 1759 to 1766.